United States Patent
Farah et al.

(10) Patent No.: US 8,669,737 B2
(45) Date of Patent: Mar. 11, 2014

(54) COURTESY LIGHT FOR AN ELECTRICAL CHARGING SYSTEM

(75) Inventors: Andrew J. Farah, Troy, MI (US); David E. Milburn, Highland, MI (US); Barbara A. Carter, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 13/220,040

(22) Filed: Aug. 29, 2011

(65) Prior Publication Data

US 2013/0049685 A1 Feb. 28, 2013

(51) Int. Cl.
*H01M 10/46* (2006.01)

(52) U.S. Cl.
USPC .......................................................... 320/107

(58) Field of Classification Search
USPC .......... 320/104, 107, 108, 114, 115; 362/459, 362/529, 800
See application file for complete search history.

(56) References Cited

U.S. PATENT DOCUMENTS

| | | | |
|---|---|---|---|
| 2008/0246416 A1* | 10/2008 | Jones et al. | 320/101 |
| 2012/0091957 A1 | 4/2012 | Masuda | |
| 2012/0129378 A1* | 5/2012 | Kiko et al. | 362/253 |

FOREIGN PATENT DOCUMENTS

WO 2010150359 A1 12/2010

OTHER PUBLICATIONS

Office Action regarding corresponding DE Application No. 10 2012 214 894.9; issued Nov. 4, 2013; 5 pgs.
"Surface Vehicle Recommended Practice," SAE International J 1772; Issued Oct. 1996; revised Jan. 2010; pp. 10-12.

* cited by examiner

*Primary Examiner* — Edward Tso
(74) *Attorney, Agent, or Firm* — Cantor Colburn LLP

(57) ABSTRACT

An electrical charging system is provided, and includes a voltage supply and a conductive coupling element. The conductive coupling element includes a pilot circuit, a resistance element, a light-emitting diode ("LED"), and a switching element. The pilot circuit has a primary control contact and a ground contact. The pilot circuit is configured to be in communication with and receive voltage from the voltage supply. The pilot circuit is configured for supplying a control pilot voltage. The resistance element is electrically connected to the ground contact. The resistance element includes a resistance value. The LED is electrically connected to the resistance element and the ground contact, and has a forward voltage drop. The switching element is actuated to selectively connect the resistance element and the LED element to the primary control contact.

20 Claims, 3 Drawing Sheets

US 8,669,737 B2

COURTESY LIGHT FOR AN ELECTRICAL CHARGING SYSTEM

FIELD OF THE INVENTION

Exemplary embodiments of the invention relate to electrical charging systems and, more particularly, to an electrical charging system having a switching element that is actuated to selectively connect a resistance element and a LED element to a primary control contact.

BACKGROUND

Electric vehicle supply equipment ("EVSE") typically includes a connector that connects to, and allows for charging of, battery electric vehicles ("BEV") and plug-in hybrid electric vehicles ("PHEV") from an available source of electricity. Some types of EVSE include a courtesy light or flashlight that is integrated into the connector. However, the flashlight needs an additional conductor element in the connector to work, which in turn adds to the cost and complexity of the EVSE. In one alternative approach, batteries may be provided in the connector to supply power to the flashlight. However, batteries will eventually become depleted. Batteries also add cost, mass, and complexity to the connector. Accordingly, it is desirable to provide a cost-effective, lightweight connector for an electric vehicle charger having a courtesy light.

SUMMARY OF THE INVENTION

In one exemplary embodiment of the invention, an electrical charging system is provided, having a voltage supply and a conductive coupling element. The conductive coupling element includes a pilot circuit, a resistance element, a light-emitting diode ("LED"), and a switching element. The pilot circuit has a primary control contact and a ground contact. The pilot circuit is configured to be in communication with and receive voltage from the voltage supply. The pilot circuit is configured for supplying a control pilot voltage. The resistance element is electrically connected to the ground contact. The resistance element includes a resistance value. The LED is electrically connected to the resistance element and the ground contact, and has a forward voltage drop. The switching element is actuated to selectively connect the resistance element and the LED element to the primary control contact. The resistance value of the resistance element and the forward voltage drop of the LED are such that the control pilot voltage supplied by the pilot circuit is at least a threshold value if the switching element connects the resistance element and the LED element to the primary control contact.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
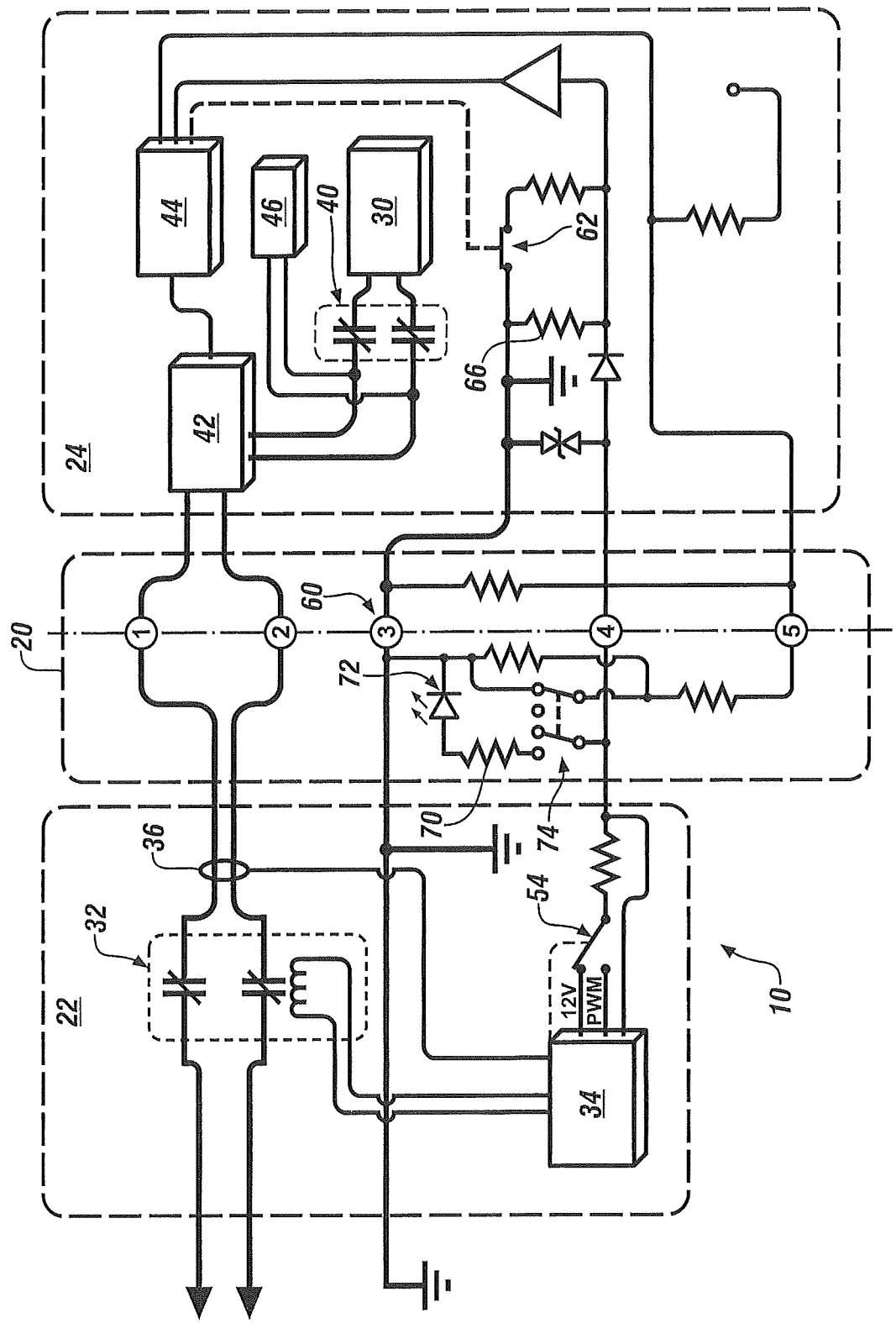
FIG. 1 is a schematic diagram of an exemplary electrical charging system.

The following description is merely exemplary in nature and is not intended to limit the present disclosure, its application or uses. It should be understood that throughout the drawings, corresponding reference numerals indicate like or corresponding parts and features. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a schematic exemplary embodiment is directed to an electrical charging system 10 having a conductive coupling element 20, electric vehicle supply equipment ("EVSE") 22, and a vehicle charging system 24. In one example, the vehicle charging system 24 may be part of a battery electric vehicle ("BEV") or a plug-in hybrid electric vehicle ("PHEV"). The EVSE 22 is the off-board power source for re-charging a battery 30 of the vehicle charging system 24. In the embodiment as shown, the EVSE 22 includes an electro-mechanical contactor 32, a control electronics module 34, and the conductive coupling element 20. The vehicle charging system 24 includes the battery 30, a contactor 40, a battery charger 42, a charge controller 44, and an isolation monitor 46. The battery charger 42 provides electrical energy, and the battery 30 stores the electrical energy provided by the battery charger 42. The charger controller 44 is configured for transmitting the electrical energy from the battery charger 42 and the battery 30 to an electrical system of a vehicle (not shown).

In one exemplary embodiment, the conductive coupling element 20 is a vehicle connector that complies with the SAE J1772 protocol, however it is understood that other configurations for the conductive coupling element 20 may be used as well. The conductive coupling element 20 is coupled to the contactor 32, and is typically a multi-pin connector that provides the connection from the EVSE 22 to the vehicle charging system 24. The conductive coupling element 20 typically includes a series of pin connectors or contacts such as, for example, the pins 1-5 as shown in FIG. 1. In the exemplary embodiment as shown, pins 1 and 2 may be used to provide an AC power signal from the EVSE 22 to the vehicle charging system 24, pins 3 and 4 are for a control pilot circuit 60, and pin 5 is used as proximity detection.

The control electronic module 34 typically controls operation of the EVSE 22. The control electronic module 34 includes a voltage supply as well. Referring now to both FIGS. 1-2, the control electronic module 34 includes a static DC voltage supply 50 and an oscillator 52. In one exemplary embodiment, the DC voltage supply 50 provides a 12 volt static signal, and the oscillator 52 is configured for providing a 1 KHz square wave at about +/−12 volts. A switching element 54 is provided between the DC power supply 50 and the oscillator 52, and connects one of the DC power supply 50 and the oscillator 52 to the control pilot circuit 60. In the example as illustrated, the switching element 54 is a single-pole single throw type switch, however it is understood that other types of switching elements may be used as well.

Figure 2:
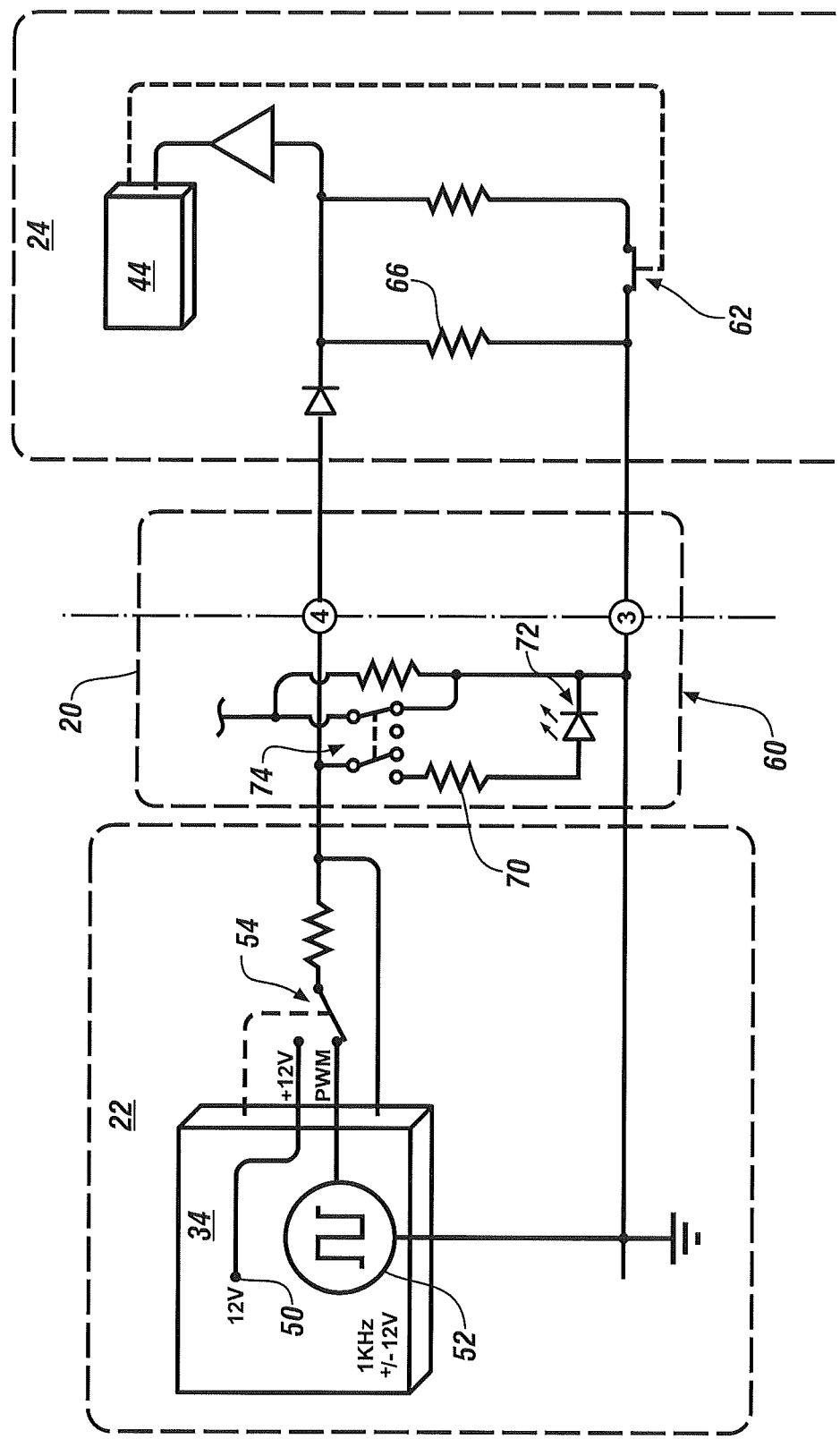
FIG. 2 is a schematic diagram of a pilot circuit shown in FIG. 1.

Turning now to FIG. 2, the control pilot circuit 60 is illustrated. The control pilot circuit 60 is typically employed to verify presence of vehicle charging system 24, to authorize the EVSE 22 to supply energy by switching the voltage supplied by the control electronic module 34 to the oscillator 52 to indicate that vehicle charging system 24 is ready to accept energy from the EVSE 22 by closing a switching element 62, and to determine if the vehicle charging system 24 needs indoor charging ventilation. The control pilot circuit 60 includes contacts 3 and 4, where contact 3 is a ground contact and contact 4 is a primary control contact. The control pilot circuit 60 is in communication with and receives voltage from the control electronic module 34. Specifically, in the embodiment as shown, the contact 4 is in communication with the control electronic module 34 to receive voltage from either the DC power supply 50 or the oscillator 52 depending on the position of the switching element 54.

The control pilot circuit 60 is configured for supplying a control pilot voltage to the vehicle charging system 24. Specifically, in one exemplary embodiment the communication between the control pilot circuit 60 and the vehicle charging system 24 may be described as follows, however it is understood that other approaches may be used as well. The control electronic module 34 supplies the static DC power supply 50 to the control pilot circuit 60 in the event the EVSE 22 is not connected to the vehicle charging system 24. Once the EVSE 22 is connected to the vehicle charging system 24, and if the switching element 62 is opened, a resistor 66 on the vehicle charging system 24 will pull the control pilot voltage down past a threshold value as measured at the contacts 3 and 4. For example, in one embodiment the static DC power supply 50 supplies a 12 volt signal to the vehicle charging system 24. In the event the control electronics in the control electronic module 34 detect the control pilot voltage being pulled down past the threshold value, the switching element 54 is actuated to disconnect the control pilot circuit 60 from the static DC voltage supply 50, and connects the oscillator 52 to the control pilot circuit 60. In one example, the threshold value is about 9 volts. Specifically, in one embodiment the threshold value may range from about 8.36 volts to about 9.56 volts, however it is understood other voltage values may be used as well. Once the switching element 54 connects the oscillator 52 to the control pilot circuit 60, the oscillator 52 will then produce a +9, −12 1 KHz square wave that is supplied to the vehicle charging system 24. Thus, the EVSE 22 will provide a static DC voltage to the vehicle charging system 24 until the vehicle charging system 24 pulls the voltage down past the threshold value.

The control pilot circuit 60 includes a resistance element 70, a light-emitting diode ("LED") 72, and a switching element 74. The resistance element 70 is electrically connected to the ground contact 3, and includes a resistance value that is measured in Ohms. The LED 72 is electrically connected to the resistance element 70 and the ground contact 3. The LED 72 includes a forward voltage drop. In one exemplary embodiment, the forward voltage drop is approximately 3.4 volts for a white LED, however it is understood that other values may be used as well. In the embodiment as shown in FIGS. 1-2, the switching element 74 is a double throw single pole switch.

The switching element 74 is selectively actuated to connect the resistance element 70 and the LED 72 to the primary control contact 4. Specifically, referring to both FIGS. 2-3, the switching element 74 is actuated by a coupler latch 80 located in a housing 82 of the conductive coupling element 20. That is, the switching element 74 is typically mechanically linked to the coupler latch 80. The coupler latch 80 is provided in an effort to reduce or substantially prevent the occurrence of inadvertent or accidental decoupling between the vehicle charging system 24 and EVSE 22. Specifically, when the coupler latch 80 is depressed by a user, a latch lever 86 located under a fixed hood 90 (shown in FIG. 3) of the conductive coupling element 20 is raised to allow for the EVSE 22 to connect to a vehicle.

Figure 3:
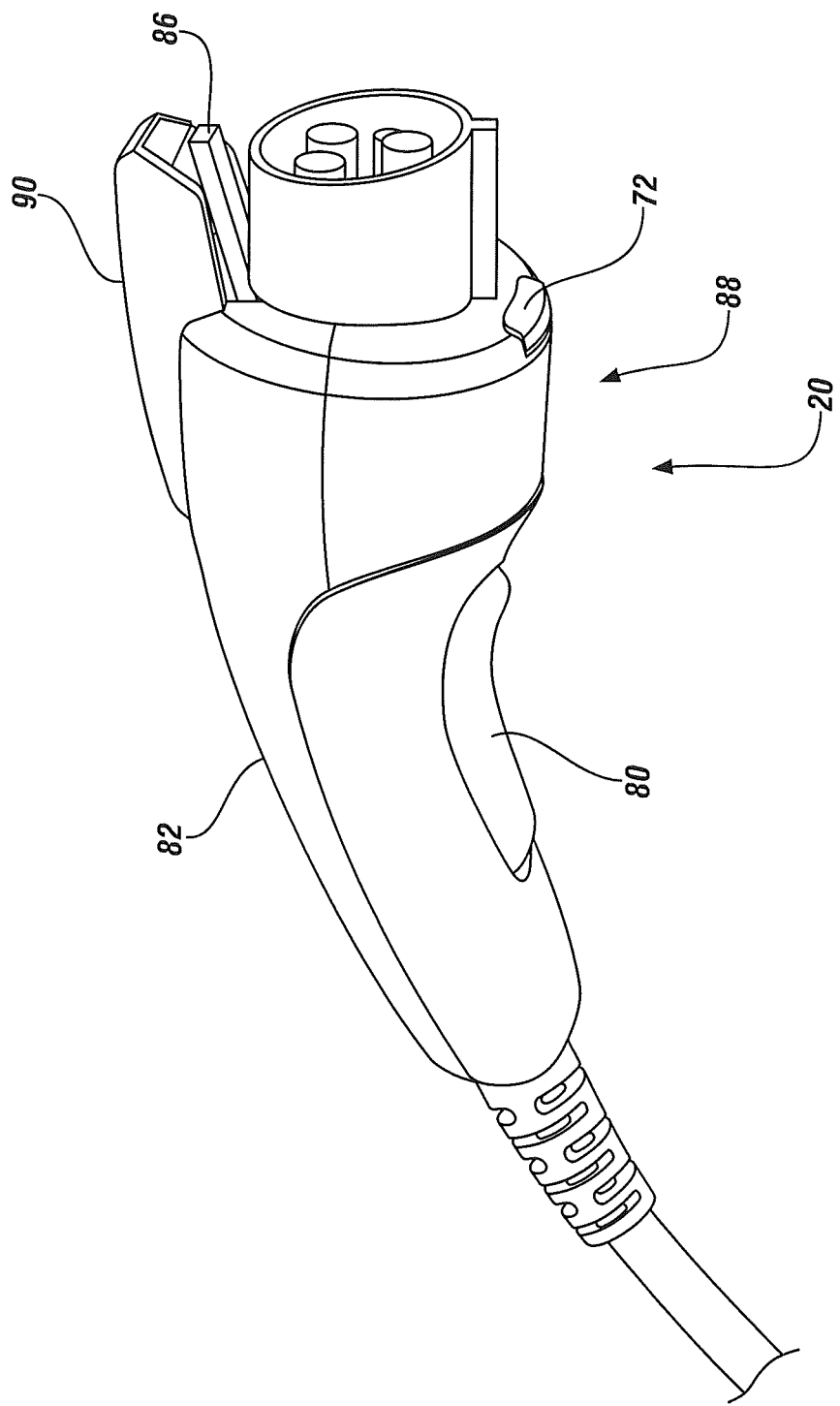
FIG. 3 is an illustration of a connector that is employed in the charging system shown in FIG. 1.

The switching element 74 normally connects the proximity detection contact 5 (the proximity detection contact is shown in FIG. 1) with the ground contact 3 at all times except when an operator depresses the coupler latch 80. FIGS. 1-2 illustrate the switching element 74 in the normal position connecting the proximity detection contact 5 with the ground contact 3. The switching element 74 is actuated such that in the event that the coupler latch 80 is depressed by a user, the switching element 74 connects the resistance element 70 and the LED 72 to the primary control contact 4. Thus, when an operator depresses the coupler latch 80, voltage is supplied to the LED 72 such that the LED 72 is switched on and energy in the form of photons is released, thereby emitting light. The LED 72 provides lighting to assist an operator in locating a vehicle outlet (not shown), especially in low light conditions. FIG. 3 illustrates the LED 72 located along a bottom portion 88 of the housing 82 of the conductive coupling element 20. Referring back to FIGS. 1-2, when the coupler latch 80 is released the switching element 74 will disconnect the resistance element 70 and the LED 72 from the primary control contact 4, and the switching element 74 then connects the proximity detection contact 5 (shown in FIG. 1) with the ground contact 3. When the coupler latch 80 is released, voltage is no longer supplied to the LED 72.

The resistance value of the resistance element 70 and the forward voltage drop of the LED 72 are such that the control pilot voltage is at least the threshold value if the switching element 74 connects the resistance element 70 and the LED 72 to the primary control contact 4. That is, in the event a static DC voltage is supplied from the control electronic module 34, the resistance value of the resistance element 70 is selected such that the control pilot voltage as measured at the contacts 3 and 4 will not drop past the threshold voltage value. If the control pilot voltage drops past the threshold value, then the switching element 54 connects the oscillator 52 to the control pilot circuit 60. For example, in one embodiment the resistance value of the resistance element 70 is selected such that the threshold voltage as measured at the contacts 3 and 4 does not drop below about 9 volts. Thus, the resistance value of the resistance element 70 is selected based on the forward voltage drop of the LED 72, as well as the threshold value of the control pilot circuit 60.

The control pilot circuit 60 provides voltage to the LED 72 in the event the coupler latch 80 is depressed by a user, without the need for a dedicated wire or conductor in the conductive coupling element 20. Eliminating a dedicated wire will in turn reduce the cost, mass and complexity of the EVSE 22, while at the same time providing lighting to assist an operator in locating a vehicle outlet (not shown).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An electrical charging system, comprising:
  a voltage supply;
  a conductive coupling element, comprising:

a pilot circuit having a primary control contact and a ground contact, the pilot circuit configured to be in communication with and receiving voltage from the voltage supply, the pilot circuit configured for supplying a control pilot voltage;

a resistance element electrically connected to the ground contact, wherein the resistance element includes a resistance value;

a light-emitting diode ("LED") electrically connected to the resistance element and the ground contact, the LED having a forward voltage drop; and a switching element that is actuated to selectively connect the resistance element and the LED element to the primary control contact, the resistance value of the resistance element and the forward voltage drop of the LED being such that the control pilot voltage supplied by the pilot circuit is at least a threshold value if the switching element connects the resistance element and the LED element to the primary control contact.

2. The electrical charging system of claim 1, wherein the conductive coupling element includes a coupler latch that is selectively depressed.

3. The electrical charging system of claim 2, wherein if the coupler latch is depressed the switching element connects the resistance element and the LED element to the primary control contact, and if the coupler latch is released the switching element disconnects the resistance element and the LED element from the primary control contact.

4. The electrical charging system of claim 3, wherein if the coupler latch is released, the switching element connects the ground contact with a proximity detection contact.

5. The electrical charging system of claim 1, wherein the threshold voltage value is about 9 volts.

6. The electrical charging system of claim 1, wherein the switching element is a double-pole single-throw switch.

7. The electrical charging system of claim 1, wherein the electrical charging system is configured by SAE J1772.

8. The electrical charging system of claim 1, wherein the voltage supply includes a static DC voltage supply and an oscillator.

9. The electrical charging system of claim 8, wherein the oscillator provides a 1 KHz square wave.

10. The electrical charging system of claim 8, wherein the electrical charging system includes a second switching element to connect one of the static DC voltage supply and the oscillator to the pilot circuit.

11. The electrical charging system of claim 10, wherein if the control pilot voltage is pulled down past the threshold value, then the second switching element is actuated to connect the oscillator to the control pilot circuit.

12. An electrical charging system for a vehicle, comprising:

a voltage supply;

a conductive coupling element, comprising:

a pilot circuit having a primary control contact and a ground contact, the pilot circuit configured to be in communication with and receiving voltage from the voltage supply, the pilot circuit configured for supplying a control pilot voltage to a vehicle charging system;

a resistance element electrically connected to the ground contact, wherein the resistance element includes a resistance value;

a light-emitting diode ("LED") electrically connected to the resistance element and the ground contact, the LED having a forward voltage drop;

a switching element that is actuated to selectively connect the resistance element and the LED element to the primary control contact, the resistance value of the resistance element and the forward voltage drop of the LED being such that the control pilot voltage supplied by the pilot circuit is at least a threshold value if the switching element connects the resistance element and the LED element to the primary control contact; and a coupler latch being selectively depressible, wherein if the coupler latch is depressed the switching element connects the resistance element and the LED element to the primary control contact, and if the coupler latch is released the switching element disconnects the resistance element and the LED element with the primary control contact.

13. The electrical charging system of claim 12, wherein the threshold voltage value is about 9 volts.

14. The electrical charging system of claim 12, wherein if the coupler latch is released, the switching element connects the ground contact with a proximity detection contact.

15. The electrical charging system of claim 12, wherein the electrical charging system is configured by SAE J1772.

16. The electrical charging system of claim 12, wherein the voltage supply includes a static DC voltage supply and an oscillator.

17. The electrical charging system of claim 16, wherein the oscillator provides a 1 KHz square wave.

18. The electrical charging system of claim 16, wherein the electrical charging system includes a second switching element to connect one of the static DC voltage supply and the oscillator to the pilot circuit.

19. The electrical charging system of claim 18 wherein if the control pilot voltage is pulled down past the threshold value, then the second switching element is actuated to connect the oscillator to the control pilot circuit.

20. An electrical charging system for a vehicle, comprising:

a voltage supply having a static DC voltage supply and an oscillator, the static DC voltage supply supplying a static DC voltage;

a first switching element to select between the static DC voltage supply and the oscillator;

a proximity detection contact;

a conductive coupling element, comprising:

a pilot circuit having a primary control contact and a ground contact, the pilot circuit configured to be in communication with and receiving voltage from the voltage supply, the pilot circuit configured for supplying a control pilot voltage to a vehicle charging system;

a resistance element electrically connected to the ground contact, wherein the resistance element includes a resistance value;

a light-emitting diode ("LED") electrically connected to the resistance element and the ground contact, the LED having a forward voltage drop;

a second switching element that is actuated to selectively connect the resistance element and the LED element to the primary control contact, the resistance value of the resistance element and the forward voltage drop of the LED being such that the control pilot voltage supplied by the pilot circuit is at least a threshold value if the second switching element connects the resistance element and the LED element to the primary control contact, and if the control pilot circuit is pulled down past the threshold value, then the first switching element is actuated to connect the oscillator to the control pilot circuit; and a coupler latch being selectively depressible, wherein if the coupler latch is depressed the second switching element connects the resistance element and the LED element to the primary control contact, and if the coupler latch is released the second switching element disconnects the resistance element and the LED element with the primary control contact and connects the ground contact with the proximity detection contact.

* * * * *